United States Patent
Provencio et al.

(10) Patent No.: US 12,400,676 B2
(45) Date of Patent: Aug. 26, 2025

(54) METHOD AND APPARATUS FOR DIALOGUE UNDERSTANDABILITY ASSESSMENT

(71) Applicant: DTS, Inc., Calabasas, CA (US)

(72) Inventors: David Cortes Provencio, Calabasas, CA (US); Martin Walsh, Calabasas, CA (US); Brian Slack, Calabasas, CA (US); Edward Stein, Calabasas, CA (US)

(73) Assignee: DTS, Inc., Calabasas, CA (US)

( * ) Notice: Subject to any disclaimer, the term of this patent is extended or adjusted under 35 U.S.C. 154(b) by 258 days.

(21) Appl. No.: 17/846,864

(22) Filed: Jun. 22, 2022

(65) Prior Publication Data

US 2022/0328062 A1 Oct. 13, 2022

Related U.S. Application Data

(63) Continuation of application No. PCT/US2019/068391, filed on Dec. 23, 2019.

(51) Int. Cl.
*G10L 25/60* (2013.01)
*G10L 15/26* (2006.01)

(52) U.S. Cl.
CPC ............ *G10L 25/60* (2013.01); *G10L 15/26* (2013.01)

(58) Field of Classification Search
CPC .......... G10L 25/60; G10L 15/26; G10L 25/69
See application file for complete search history.

(56) References Cited

U.S. PATENT DOCUMENTS

| | | | |
|---|---|---|---|
| 6,272,461 B1 * | 8/2001 | Meredith | G10L 21/06 704/235 |
| 9,876,901 B1 * | 1/2018 | Bazzica | G10L 25/69 |
| 11,342,003 B1 * | 5/2022 | Siagian | G11B 27/28 |
| 2002/0147587 A1 | 10/2002 | Townshend et al. | |
| 2015/0331941 A1 * | 11/2015 | Defouw | H04N 21/233 707/687 |
| 2016/0316059 A1 * | 10/2016 | Nuta | G06N 7/01 |
| 2017/0243517 A1 * | 8/2017 | Midmore | G06F 40/56 |
| 2018/0032611 A1 * | 2/2018 | Cameron | G06F 16/685 |
| 2020/0058289 A1 * | 2/2020 | Gabryjelski | G06F 40/58 |
| 2020/0104362 A1 * | 4/2020 | Yang | G06N 5/048 |
| 2020/0227066 A1 * | 7/2020 | Taub | G10L 25/15 |
| 2023/0009878 A1 * | 1/2023 | Port | G06F 3/165 |

(Continued)

FOREIGN PATENT DOCUMENTS

WO WO-02071390 A1 * 9/2002 ............ G09B 19/04

OTHER PUBLICATIONS

WO-02071390-A1-Translation (Year: 2002).*

(Continued)

*Primary Examiner* — Darioush Agahi
(74) *Attorney, Agent, or Firm* — Lerner David LLP

(57) ABSTRACT

A method comprises: obtaining a mixed soundtrack that includes dialogue mixed with non-dialogue sound; converting the mixed soundtrack to comparison text; obtaining reference text for the dialogue as a reference for intelligibility of the dialogue; determining a measure of intelligibility of the dialogue of the mixed soundtrack to a listener based on a comparison of the comparison text against the reference text; and reporting the measure of intelligibility of the dialogue.

17 Claims, 13 Drawing Sheets

(56) References Cited

U.S. PATENT DOCUMENTS

2023/0010466 A1* 1/2023 Port .......................... H04R 5/04
2023/0089648 A1* 3/2023 Peleg ....................... H04N 5/77
                                                           386/285

OTHER PUBLICATIONS

International Search Report and Written Opinion in corresponding PCT Application No. PCT/US2019/068391, dated Aug. 17, 2020, 15 pages.

Lopatka, K., et al., "Improving listeners' experience for movie playback through enhancing dialogue clarity in soundtracks", Digital Signal Processing, vol. 48, pp. 40-49 (2015).

Mapp, P., et al., Intelligibility of Cinema & TV Sound Dialogue, AES Convention 141, section "Dialogue Intelligibility", XP040680966, 15 pages (2016).

Zobel, J., et al., "Phonetic String Matching: Lessons from Information Retrieval", SIGIR '96: Proceedings of the 19th annual international ACM SIGIR conference on Research and development in information retrieval, pp. 166-172 (1996).

Justin, T., et al., Intelligibility Assessment of the De-Identified Speech Obtained Using Phoneme Recognition and Speech Synthesis Systems, International Conference on Text, Speech, and Dialogue, pp. 529-536, (2014).

Spille, C., et al., "Predicting Speech Intelligibility with Deep Neural Networks", Computer Speech & Language, 1 page, abstract (2017).

* cited by examiner

| Slice ID | SRT Text (Reference) | Start Time | End Time | Text from ASR (Comparison) | Score | Text from ASR after processing (Comparison) | Score | Conf |
|---|---|---|---|---|---|---|---|---|
| 0 | Why are we here? Where do we come from? These are the most enduring of questions. And it's an essential part of human | 0:00:00 | 0:00:10 | why are we here where do we come from these are the most enduring of questions and it's an essential part of human | 98.29 | why you were here where do we come from these are the most enduring of questions and it's an essential part of human | 96.79 | 90.29 |
| 1 | nature to want to find the answers. And we can trace that ancestry | 0:00:10 | 0:00:20 | nature to want to find the answers and we can trace our ancestry | 94.33 | nature to want to find the answers and we can trace our | 89.29 | 90.29 |
| 2 | back hundreds of thousands of years to the dawn of humankind. But in reality, our story extends far further back in time. Our | 0:00:20 | 0:00:30 | back hundreds of thousands of years to the dawn of humankind but in reality our story extends far further back in time our | 98.40 | back hundreds of thousands of years to the dawn of humankind but in reality our story extends far further back in time our | 98.40 | 90.29 |
| 3 | story starts with the beginning of the universe. It began 13.7 | 0:00:30 | 0:00:40 | story starts with the beginning of the universe it began 13.7 | 98.39 | story starts with the beginning of the universe it began 13.7 | 98.39 | 90.06 |
| 4…12 | … | … | … | … | … | … | … | … |
| 13 | This is Chankillo on the | 0:02:10 | 0:02:20 | this is Chang Kyo on the | 85.00 | mrs. Chang Kyo the | 54.50 | 8.38 |
| 14 | coast of Peru. And it's one of South America's lesser known archaeological sites. But, for me, it is surely one of the most fascinating. | 0:02:20 | 0:02:30 | coast of Peru and it's one of South America's lesser known archaeological sites but for me it is surely one of the most fascinating | 98.16 | coast of Peru and it's one of the fact that America is less than known archaeological sites but for me it is surely one of the most fascinating | 89.71 | 88.38 |
| 15 | fascinating. Around 2,500 years ago, | 0:02:30 | 0:02:40 | Ryan two and a half | 38.44 | Brent two and a half | 37.25 | 77.55 |

FIG. 8

METHOD AND APPARATUS FOR DIALOGUE UNDERSTANDABILITY ASSESSMENT

CROSS REFERENCE TO RELATED APPLICATIONS

This application is a continuation of International Application No. PCT/US2019/068391, filed on Dec. 23, 2019, the entire contents of which are hereby incorporated by reference.

TECHNICAL FIELD

The present disclosure relates to assessing the intelligibility of dialogue on soundtracks.

BACKGROUND

In the entertainment industry, content distributors stream audio-visual content, such as movies and television (TV) shows, to consumers for consumption of the content by the consumers. With respect to audio, content producers face a significant problem in the form of numerous and persistent complaints from the consumers about their inability to hear and understand dialogue from their streamed content properly at home. Conventional approaches to solving the problem attempt to raise voice intelligibility of the dialogue through traditional digital signal processing (DSP) techniques, such as boosting a vocal frequency range. The conventional approaches generally assume that the DSP techniques fix the "understandability" problem, but do not assess or address how well consumers actually understand the dialogue either before or after the additional processing. This results in a quality control (QC) gap between the problem, i.e., consumer complaints about poor dialogue intelligibility, and its solutions, thus leaving the content producers and/or the sound engineers tasked with implementing the solutions without knowledge as to whether they actually adequately fixed the problem as reported.

BRIEF DESCRIPTION OF THE DRAWINGS

FIG. 8 is an illustration of an example intelligibility report in the form of a table having rows for successive time slices of the dialogue from FIGS. 6 and 7, and columns for various data corresponding to each of the time slices.

DESCRIPTION OF EXAMPLE EMBODIMENTS

Example Embodiments

Figure 1:
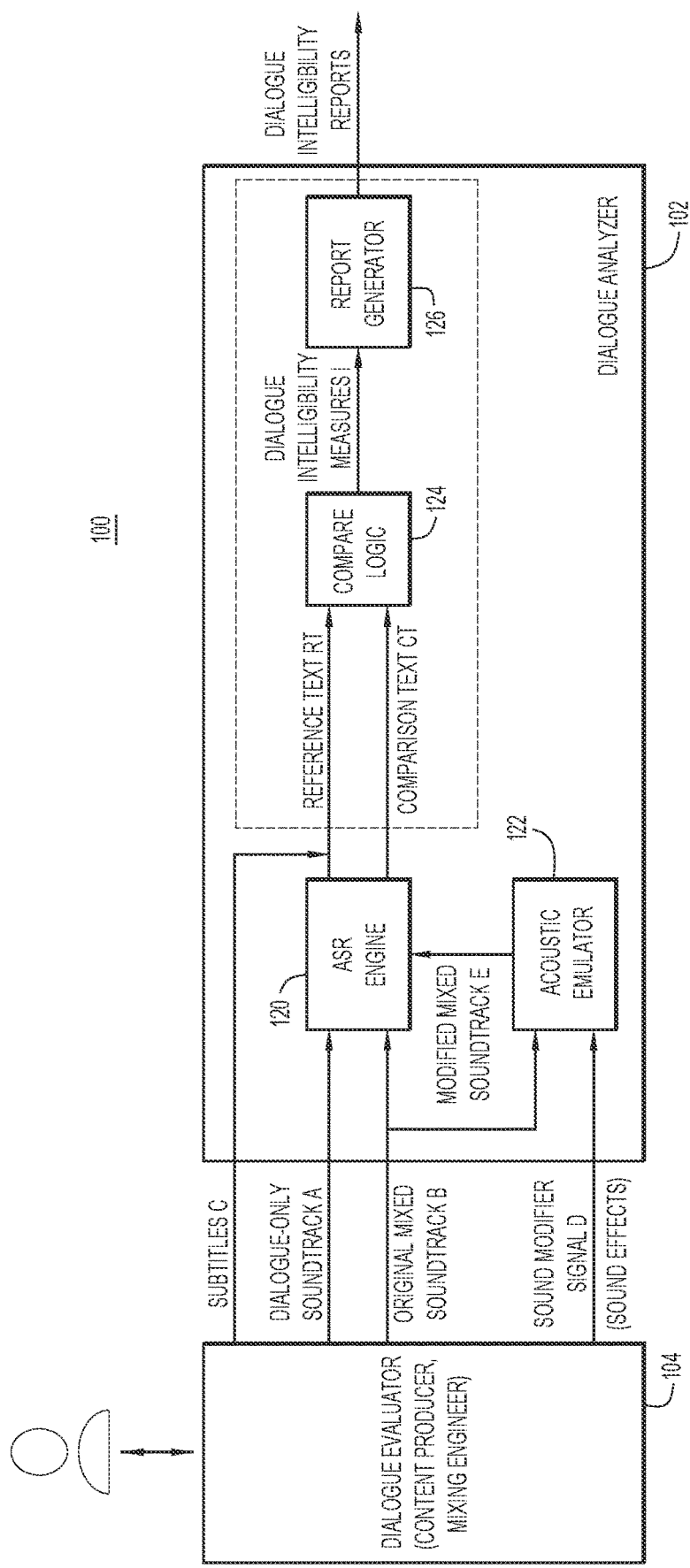
FIG. 1 is a block diagram of an example sound engineering environment for assessing and improving the intelligibility of dialogue of soundtracks to a listener.

Content distributors stream audio-visual content, including a mixed soundtrack for movies, TV shows, and the like, to a consumer. The mixed soundtrack may include dialogue and non-dialogue sound, including music and sound-effects for movies/TV, for example. The consumer plays-back the mixed soundtrack through a sound reproduction system of a playback device, such as a television or a computer. Often, the consumer cannot understand dialogue from the mixed soundtrack as played-back through the sound reproduction system in a playback room of the consumer, such a living room. The consumer may not be able to understand the dialogue due to many factors that can degrade the intelligibility or "understandability" of the dialogue. As used herein, the terms "intelligibility" and "understandability" are synonymous and interchangeable. The factors that may degrade the intelligibility of dialogue include:

a. A low signal-to-noise ratio (SNR) of the dialogue. For example, sound mixing levels may cause the non-dialogue sound to be too loud with respect to the dialogue, which drowns-out the dialogue. Also, background noise in the playback room may drown-out the dialogue.
  b. Acoustic properties of the playback room, such as reverberation, may interfere with or degrade the intelligibility of the dialogue.
  c. Limitations of the sound reproduction system may degrade the intelligibility of the dialogue.
  d. Word articulation and enunciation in the dialogue, e.g., accents, may sound confusing to the consumer, thereby degrading the intelligibility of the dialogue even when the dialogue is played back with a high SNR.

e. Personal hearing deficiencies and impairments of the consumer may degrade the intelligibility of the dialogue.

To implement effective solutions to problems associated with degraded intelligibility of dialogue, it is helpful to be able to assess the intelligibility of the dialogue to a consumer (referred to in the ensuing description as a "listener") before and after implementing the solutions. For example, it is helpful to be able to predict the likelihood of decreased or degraded intelligibility of the dialogue. It is also helpful to assess the impact of the above-mentioned factors on the intelligibility of the dialogue, so that the solutions can compensate for the factors properly. A disadvantage of conventional solutions is that they do not attempt to estimate the likelihood that the listener can understand the dialogue, i.e., that the dialogue is intelligible to the listener.

Accordingly, embodiments presented herein assesses the accuracy of automatic speech recognition (ASR), for example, to estimate the likelihood that dialogue from soundtracks will be understood by the listener. More specifically, the embodiments employ ASR, for example, to estimate or predict the intelligibility of dialogue of a soundtrack to a listener in a playback room or "listening environment." For example, the embodiments analyze and quantify a likelihood of dialogue intelligibility of typical TV and movie content for playback in the typical home environment using ASR. The embodiments further emulate consumer listening scenarios, such as limitations of the sound reproduction system of the playback device, room acoustics, listening level, human hearing loss, and so on, to further predict the likelihood that the dialogue remains intelligible in the playback room. The embodiments provide dialogue intelligibility reports (also referred to as quality control (QC) reports) that include qualitative and quantitative information regarding the intelligibility of dialogue resulting from the aforementioned dialogue analysis. Such information enables effective solutions to correct degraded intelligibility. The solutions may include recording a new dialogue soundtrack or remixing the dialogue and non-dialogue sound to increase the intelligibility of dialogue to the listener.

Sound Engineering Environment

With reference to FIG. 1, there is a high-level block diagram of an example sound engineering environment 100 for assessing and improving the intelligibility of dialogue of soundtracks to the listener. Sound engineering environment 100 includes a computer-based dialogue analyzer 102 configured to analyze dialogue of soundtracks as described below and an evaluator 104, such as a content producer and/or a mixing engineer, to interact with the dialogue analyzer. Evaluator 104 may represent a combination of personnel and sound equipment, as is known. Dialogue analyzer 102 may receive from evaluator 104 a variety of inputs related to dialogue for multimedia/audio-visual content, including movies and/or TV shows, for example. Dialogue analyzer 102 analyzes the dialogue as conveyed in the inputs using sound processing techniques to produce dialogue analysis results/assessments in the form of dialogue intelligibility reports, and provides the reports to evaluator 104.

In an example, evaluator 104 may provide to dialogue analyzer 102 content in the form of soundtracks for movies and TV shows. The soundtracks may include (i) an unmixed soundtrack A for dialogue-only (also referred to as a "dialogue-only soundtrack" or a "dialogue soundtrack"), and (ii) an original mixed soundtrack B that includes the dialogue mixed with non-dialogue sound, such as music and movie/TV sound-effects, for example. In addition, evaluator 104 may provide to dialogue analyzer 102 text-based subtitles C that represent the dialogue on the dialogue-only and mixed soundtracks. Dialogue analyzer 102 may also receive from evaluator 104 a sound modifier signal D that may be used by dialogue analyzer 102 to emulate sound effects for various impairments, including one or more of playback room acoustics, background noise, limitations of the sound reproduction system of a playback device, hearing impairments of the listener, and so on. The emulated sound effects are distinct from the non-dialogue sound, e.g., movie/TV sound effects, of the original mixed soundtrack B, mentioned above.

Dialogue analyzer 102 implements processes to measure the intelligibility of dialogue on each of the dialogue-only soundtrack A, the original mixed soundtrack B, and a modified mixed soundtrack E (that includes the original mixed soundtrack combined with emulated sound effects) against an ideal reference of/standard for intelligibility. Dialogue analyzer 102 generates dialogue intelligibility reports that include the measures of intelligibility, and may provide the reports to evaluator 104. To this end, dialogue analyzer 102 includes an ASR engine 120, an acoustic emulator 122, compare logic 124, and a report generator 126 coupled to, and configured to interact with, each other.

ASR engine 120 may include one or more neural networks, such as a deep neural network (DNN), to perform machine-learning (ML)-based ASR to convert dialogue conveyed by each of the dialogue-only soundtrack A, the original mixed soundtrack B, and the modified mixed soundtrack E to corresponding ASR (dialogue) text, and provides the text to compare logic 124. ASR engine 120 may include any known or hereafter developed ASR technology used to convert soundtracks of dialogue to text. With respect to performing ASR on the mixed/modified mixed soundtrack B/E, ASR engine 120 may include (i) a signal processing algorithm, including an ML-based algorithm (e.g., an ML dialogue extractor), to extract dialogue from the mixed/modified mixed soundtracks to produce a predominantly dialogue soundtrack, and (ii) an ASR algorithm to convert the predominantly dialogue soundtrack to text.

Acoustic emulator 122 receives the sound modifier signal D and emulates the above-mentioned sound effects based on the sound modifier signal, to produce emulated sound effects. Acoustic emulator 122 combines the emulated sound effects into the original mixed soundtrack B, to produce the modified mixed soundtrack E. Any known or hereafter developed acoustic emulator may be used. Acoustic emulator 122 provides the modified mixed soundtrack to ASR engine 120.

As described in further detail below, compare logic 124 receives comparison text CT from ASR engine 120 and reference text RT, which may include text from the ASR engine or, alternatively, text-based subtitles C. Compare logic 124 determines measures of intelligibility I of dialogue represented in comparison text CT relative to reference text RT based on a comparison of the comparison text against the reference text. Compare logic 124 provides the measures of intelligibility I of the dialogue, and other compare results, to report generator 126. Report generator 126 generates dialogue intelligibility reports, including the measures of the intelligibility I of the dialogue and the other compare results, and provides the reports to dialogue evaluator 104.

The embodiments presented herein employ ASR as a predictor of intelligibility, by way of example only. Other embodiments may not rely on ASR. For example, such other embodiments may employ alternative techniques to (i) translate the dialogue of soundtracks into non-text representations of the dialogue, such as hash values or signatures that are proximate to the sound of the dialogue, and (ii) compare the non-text representations to ideal references to produce the measures of intelligibility of the dialogue. For example, the compare operation may be performed using an ML-based technique to produce comparison results indicative of the measures of intelligibility of the dialogue.

Figure 2:
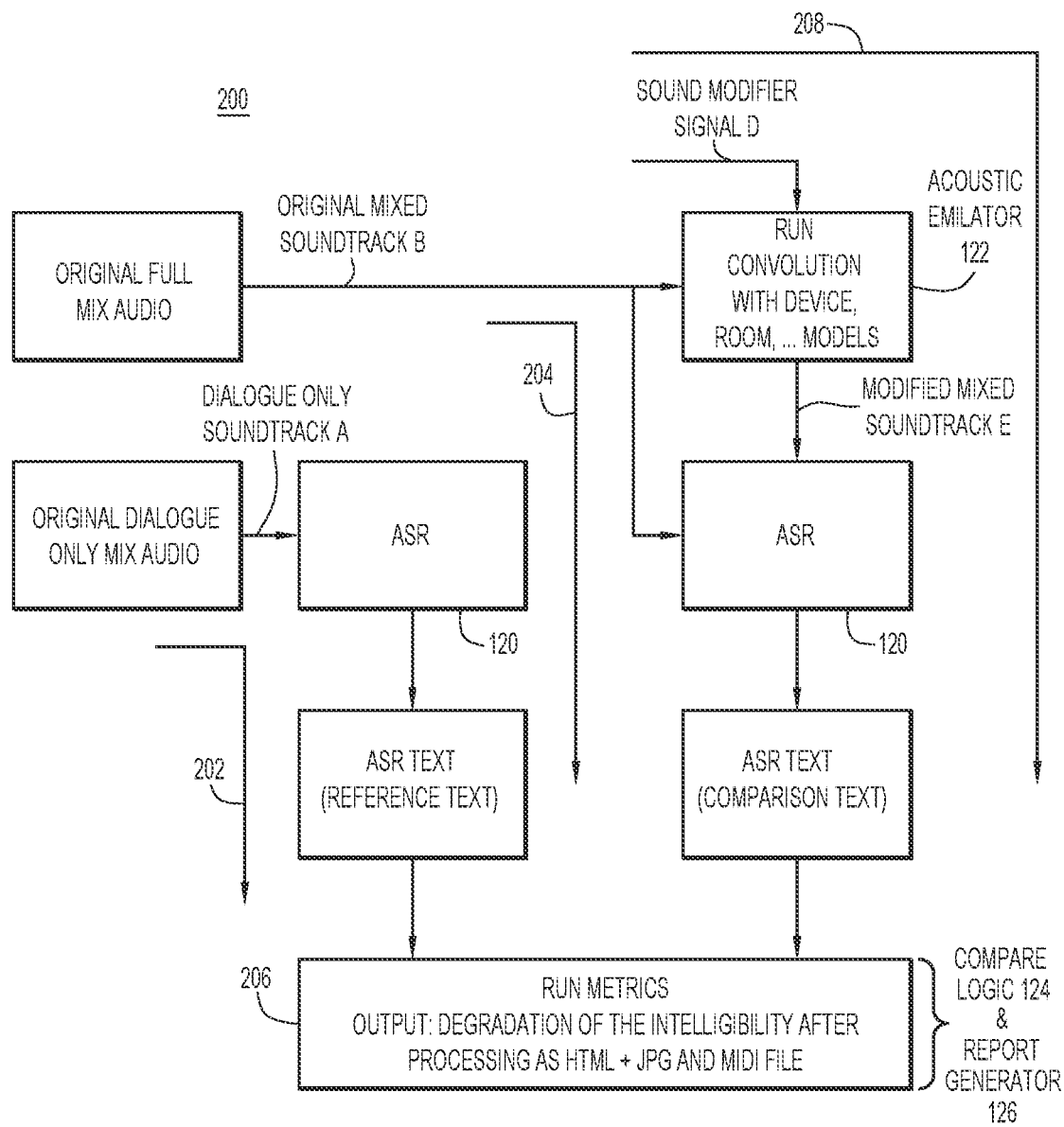
FIG. 2 is an illustration of an example first method of assessing the intelligibility of dialogue of mixed soundtracks using a dialogue-only soundtrack as a reference against which the intelligibility is measured, performed by a dialogue analyzer of the sound engineering environment.

Dialogue Intelligibility of Mixed Soundtrack Using Dialogue-Only Soundtrack as Ideal Reference With reference to FIG. 2, there is an illustration of an example first method 200 of assessing intelligibility of dialogue of the original mixed soundtrack B and the modified mixed soundtrack E using the dialogue-only soundtrack A as the ideal reference/standard against which the intelligibility is measured. Method 200 may be performed by dialogue analyzer 102.

Dialogue Intelligibility of Original Mixed Soundtrack

Method 200 includes a first set of operations 202, 204, and 206 that collectively assess the intelligibility of dialogue of the original mixed soundtrack B, without emulated sound effects.

At 202, ASR engine 120 receives the dialogue-only soundtrack A (labeled as "Original Dialogue Only Mix Audio" in FIG. 2). The dialogue-only soundtrack A may be provided as a file in a waveform audio file (.WAV) format, for example, although other formats are possible. ASR engine 120 performs ASR on the dialogue-only soundtrack A, to convert the dialogue-only soundtrack to reference text. For example, ASR engine 120 converts successive time slices of the dialogue-only soundtrack A to corresponding successive segments of the reference text. The successive time slices each occupies a corresponding one of successive dialogue analysis time slots. The time slots (and thus the time slices) may be of a fixed duration in a range of 5-10 seconds, for example, although other time durations are possible. ASR engine 120 timestamps each of the time slots/time slices with a respective start time and a respective stop time, and also assigns to successive ones of the time slots/time slices an incrementing time slice identifier. ASR engine 120 associates the time slice information (e.g., time stamps and identifiers) with corresponding ones of the successive segments of the reference text. ASR engine 120 provides the reference text and the time slice information to compare logic 124. ASR engine 120 also generates respective confidence levels with which the ASR engine converts the time slices of dialogue-only soundtrack A to the corresponding segments of the reference text.

At 204, ASR engine 120 receives the original mixed soundtrack B (labeled as "Original Full Mix Audio" in FIG. 2). The original mixed soundtrack B may be provided as a file in a .WAV file, for example. ASR engine 120 performs ASR on the original mixed soundtrack B, to convert the dialogue of the original mixed soundtrack to comparison text. For example, ASR engine 120 converts time slices of the original mixed soundtrack B to corresponding segments of the comparison text, similar to the way in which the ASR engine converts the dialogue-only soundtrack A to the successive segments of the reference text. The segments of the comparison text and the segments of the reference text that represent the same time slice/time slot, and thus the same portion of dialogue (i.e., common dialogue segments), are referred to herein as corresponding segments of reference text and comparison text for purposes of comparison. ASR engine 120 provides the comparison text to compare logic 124.

At 206, using the reference text as a reference or standard that represents ideal or maximum intelligibility of the dialogue to a listener, compare logic 124 determines an overall measure of intelligibility of the dialogue of the original mixed soundtrack B to the listener based on a comparison between the comparison text and the reference text. That is, compare logic 124 compares the comparison text to the reference text to produce comparison results that represent an overall difference between the two texts, and determines the overall measure of intelligibility of the dialogue to the listener based on the overall difference.

More specifically, compare logic 124 (i) establishes correspondence between successive segments of the comparison text and successive segments of the reference text that represent the same/common dialogue based on the above-mentioned time slice timestamps and identifiers, (ii) using one or more compare algorithms described below, determines successive individual differences between the successive segments of the comparison text and the corresponding ones of the successive segments of the reference text that represent the common dialogue, and (iii) computes the overall measure of intelligibility of the dialogue of the original mixed soundtrack B based on the individual differences. The individual differences may be considered individual measures of intelligibility of the dialogue for corresponding ones of the successive segments of the comparison text. As used herein, the terms "measure of intelligibility of dialogue" and "dialogue intelligibility measure (or metric)" are synonymous and interchangeable, and the terms "measure" and "metric" are also synonymous and interchangeable.

In this way, the embodiments presented herein use the accuracy with which ASR engine 120 converts speech-to-text, as represented by the overall difference between the comparison text and the reference text, as a proxy for the intelligibility of the dialogue of the original mixed soundtrack B to the listener (considered an "average human listener"). As the overall difference (and, similarly, the individual differences) gradually increases from zero (indicating an exact match) to a maximum value (indicating a maximum mismatch), the measure of intelligibility of the dialogue correspondingly gradually decreases/degrades from ideal to maximally degraded, and vice versa. The exact match indicates that ASR engine 120 understands and converts the dialogue on the original mixed soundtrack B perfectly, and thus the listener fully understands the dialogue. Conversely, the mismatch indicates that ASR engine 120 does not understand the dialogue of the original mixed soundtrack B properly, and thus the listener does not fully understand the dialogue, i.e., the intelligibility of the dialogue is degraded.

The measure of intelligibility of the dialogue may be represented in many different ways. For example, dialogue analyzer 102 may normalize the measure of intelligibility of dialogue (also referred to as an "intelligibility score") from 1 to 0, such that (i) 1 represents a minimum intelligibility due to a maximum mismatch (i.e., 0% match) between the comparison text and the reference text, i.e., the comparison text and the reference text are completely different, and (ii) 0 represents a maximum intelligibility due to a complete match (i.e., 100% match, no mismatch) between the comparison text and the reference text.

In an example, compare logic 124 may compare the comparison text to the reference text using one or more known or hereafter developed compare algorithms to determine the overall difference between the comparison text and the reference text mentioned above. For example, the compare algorithms may include text distance algorithms that are edit based, token based, sequence based, compression based, phonetic or sound based, and the like, that determine text distances between the comparison text and the reference text. Example text distance algorithms include a Cosine distance algorithm, which computes text distances between letters and/or words of the compared texts, and an Editex distance algorithm developed by Zobel and Dart, which computes text distances between sounds of the compared texts, i.e., text distances between how the texts sound when spoken. In another example, the compare algorithms may include any known or hereafter developed image, pattern, and/or sound matching algorithms that determine differences between the reference text and the comparison text.

In an embodiment, compare logic 124 may use the same compare algorithm to determine individual differences between the corresponding segments of the comparison text and the reference text, and may combine the individual differences into an overall difference representative of the overall measure of intelligibility of the dialogue. For example, compare logic 124 may compute an average of the individual differences and use that average as the overall difference, and thus the overall measure of intelligibility of the dialogue.

In another embodiment, compare logic 124 may use a combination of different compare algorithms to determine each of the individual differences, before combining the individual differences into the overall difference. For example, compare logic 124 may compute each individual difference as a weighted sum of individual differences computed using the different compare algorithms, according to the following function, although other functions are possible:

Individual difference $D = c_1 d_1 + c_2 d_2 + \ldots + c_n d_n$,

Where n is an integer $\geq 0$, each $c_i$ is a coefficient, and each $d_i$ is a distinct compare algorithm.

In an example, $d_1$ and $d_2$ may represent the Cosine distance algorithm and the Editex distance algorithm, respectively.

Also at 206, report generator 126 generates dialogue intelligibility reports including results produced in operations 202-206. Various dialogue intelligibility reports are described below in connection with FIGS. 5-11. The dialogue intelligibility reports may include the overall measure of intelligibility of dialogue for an entirety of the original mixed soundtrack B, the individual measures of intelligibility of dialogue for the segments of the comparison text, segments of the comparison text corresponding to the individual measures of intelligibility, corresponding segments of the reference text, timestamps and identifiers of the time slices, additional information from compare results, and metadata, described below. The dialogue intelligibility reports may be provided in various formats, including, but not limited to, HyperText Markup Language (HTML), Joint Photographic Experts Group (JPEG), Musical Instrument Digital Interface (MIDI), and the like.

Report generator 126 may generate the above-mentioned metadata for incorporation into the dialogue intelligibility reports. Generally, metadata includes data abstracted from direct results of dialogue analysis, and that is configured for use with a digital reproduction device. Examples of digital reproduction devices include, but are not limited to, digital audio workstations (DAWs), studio audio software, and other audio-visual (AV) devices, such as televisions. The metadata may be used by a mixing engineer for playing, mixing, editing, and other processing of soundtracks to improve the intelligibility of dialogue on the soundtracks. Metadata may be used to flag degraded sections of audio on a soundtrack and to boost the level of that dialogue relative to other sections of the dialogue, to list "good" and "bad" chunks of time slices of the dialogue on the sound track, and so on.

In the description above, compare logic 124 is said to produce comparison results that represent a difference between texts indicative of intelligibility of the dialogue. Because the "difference" may be construed as an inverse to "similarity" between the texts (i.e., the greater the difference, the lesser the similarity, and vice versa), compare logic 124 may also be said to produce comparison results that represent the similarity between the texts, such that an increase in similarity indicates an increase in intelligibility, and vice versa. Under either interpretation, the comparison results indicate intelligibility of dialogue. Moreover, the above-mentioned compare algorithms may be said to produce differences, or conversely, similarities between texts that indicate intelligibility.

Dialogue Intelligibility of Modified Mixed Soundtrack

Method 200 includes a second set of operations 202, 206, and 208 that collectively assess the intelligibility of the modified mixed soundtrack E to the listener, i.e., the intelligibility of the original mixed soundtrack B combined with emulated sound effects. The above detailed description of operations 202 and 206 shall suffice for the ensuing description.

Briefly, at 202, ASR engine 120 converts the dialogue-only soundtrack A to the reference text, as described above.

At 208, sound effects emulator 122 receives the original mixed soundtrack B and the sound modifier signal D. The sound modifier signal D includes sound effects to be emulated, such as one or more of playback room acoustics, background noise, limitations of the sound reproduction system of the playback device, and hearing impairments. Sound effects emulator 122 models or simulates the one or more sound effects based on the sound modifier signal D, and modifies the original mixed soundtrack B with the sound effects, to produce modified mixed soundtrack E. The modified mixed soundtrack E represents the original mixed soundtrack combined with the (emulated) sound effects. For example, modified soundtrack E may include emulated playback room acoustics only, emulated background noise only, emulated limitations of the sound reproduction system only, emulated hearing impairments only, or a combination of two or more of the foregoing emulated sound effects.

In an example, the sound modifier signal D includes one or more .WAV files corresponding to the one or more sound effects to be emulated. The .WAV file may include impulse responses corresponding to frequency responses of whatever sound effects is/are to be emulated, such as room reverberation, sound high pass and/or low pass filter responses, gain responses, and so on, as would be appreciated by one having ordinary skill in the relevant arts having read the present description. The sound effects emulator 122 may convolve the .WAV file(s) for the sound effects with a .WAV file of the original mixed audio, to produce the modified mixed soundtrack E.

Sound effects emulator 122 provides the modified mixed soundtrack E to ASR engine 120.

ASR engine 120 performs ASR on the modified mixed soundtrack E, to convert the modified mixed soundtrack to comparison text, in the manner described above for the original mixed soundtrack. ASR engine 120 provides the comparison text, including the successive segments of the comparison text, to compare logic 124.

Briefly, at 206, compare logic 124 determines an overall measure of intelligibility of dialogue of the modified mixed soundtrack E based on a comparison of the comparison text against the reference text, and provides the overall measure of intelligibility of the dialogue, along with individual measures of intelligibility of the dialogue for corresponding ones of the segments of the comparison text, to report generator 126, as described above. Report generator 126 generates dialogue intelligibility reports based on the results from operation 206.

Using the dialogue intelligibility reports as a guide, dialogue evaluator 104 may rerecord or remix the original mixed audio soundtrack B when the dialogue intelligibility reports indicate degraded intelligibility of the dialogue with or without emulated sound effects, to produce a remixed soundtrack. Dialogue evaluator 104 may use dialogue analyzer 102 to assess the intelligibility of the dialogue of the remixed soundtrack as described above, and repeat the rerecord or remix as necessary.

Figure 3:
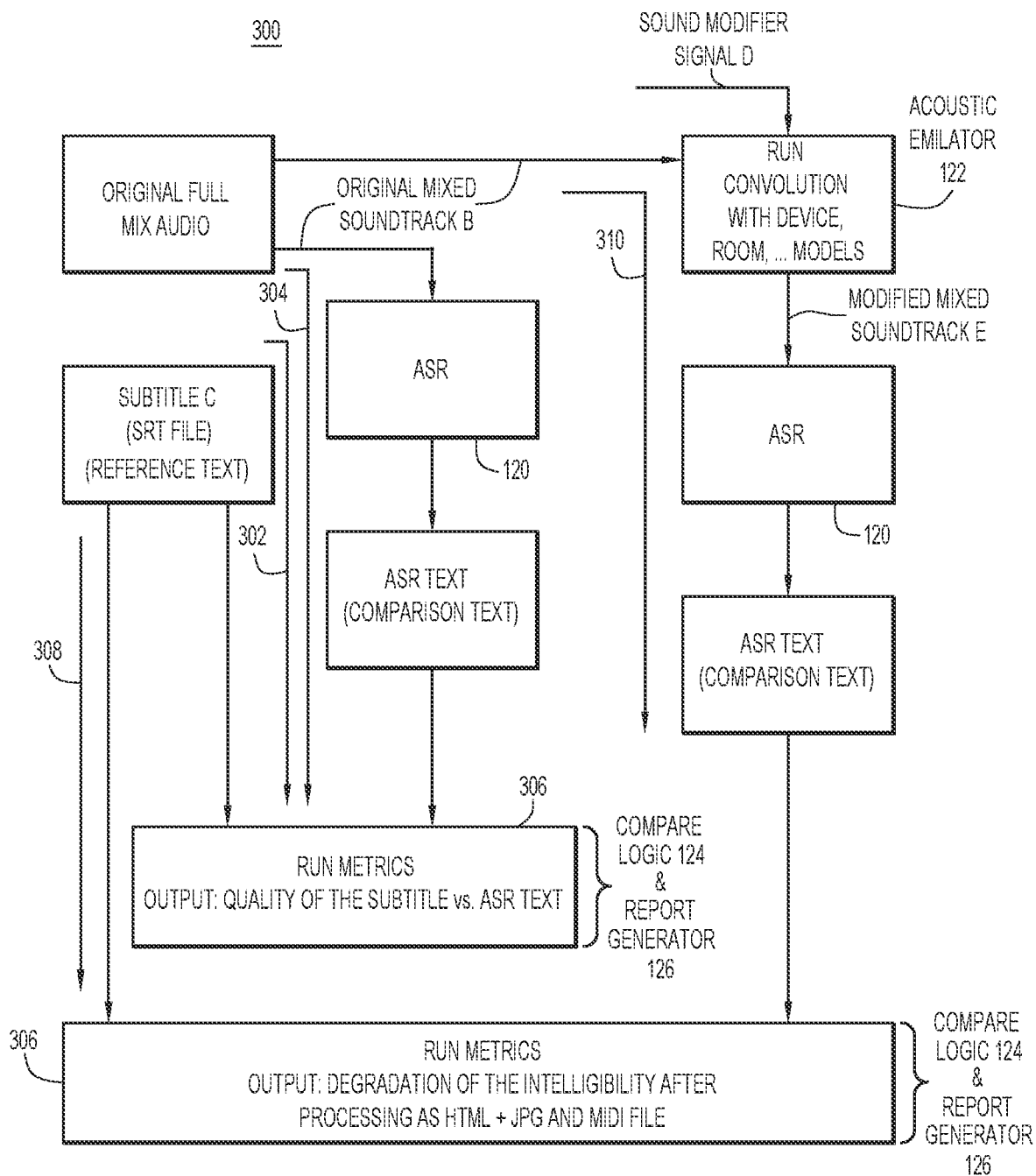
FIG. 3 is an illustration of an example second method of assessing the intelligibility of dialogue of mixed soundtracks using text-based subtitles for the dialogue as a reference against which the intelligibility is measured, performed by the dialogue analyzer.

Dialogue Intelligibility of Soundtracks Using Text-Based Subtitles as Ideal Reference With reference to FIG. 3, there is an illustration of an example second method 300 of assessing the intelligibility of dialogue of the mixed soundtracks (e.g., mixed soundtracks B and E) using text-based subtitles C for the dialogue as a reference against which the intelligibility of dialogue to the listener is measured, performed by dialogue analyzer 102.

Dialogue Intelligibility of Original Mixed Soundtrack (No Sound Effects)

Operations 302, 304, and 306 collectively assess the intelligibility of the original mixed soundtrack B referenced to the text-based subtitles C for the dialogue of the mixed soundtrack. The original mixed soundtrack B does not include emulated sound effects.

At 302, compare logic 124 receives the text-based subtitles C. The text-based subtitles may be formatted as a sequence of chunks of subtitle text that span successive, respective time intervals, which may vary with respect to each other, as indicated by respective start and stop times of the time intervals. For example, the text-based subtitles may be provided in a SubRip (SRT) format, or any other known or hereafter developed subtitle format.

At 304, ASR 120 receives the original mixed soundtrack B and performs ASR on the original mixed soundtrack, to produce the comparison text, as described above. ASR 120 provides the comparison text to compare logic 124.

Because the varying time intervals of the chunks of subtitle text C (referred to as "subtitle chunks") may differ from the fixed time slice duration for the segments of the comparison text (referred to as "comparison text segments"), there may not be a one-to-one correspondence between each of the subtitle chunks and each of the comparison text segments. Accordingly, compare logic 124 matches the text of each of the comparison text segments to the same/common text spanning corresponding ones of the subtitle chunks, to establish a correspondence between the comparison text segments and the text of the subtitle chunks that convey the same/common dialogue.

To do this, compare logic 124 may use a text matching algorithm that maximizes text similarity between the text of each of the comparison text segments to text spanning corresponding/matching ones of the subtitle chunks that are close in time or adjacent to the comparison text segments. The text matching algorithm may establish time adjacency based on the timestamps of the comparison text segments and the subtitle chunks.

To find corresponding/matching subtitle text for each comparison text segment, the text matching algorithm may perform the following example operations:

f. Determine a measure of similarity between the (current) comparison text segment and a (current) subtitle text string spanning one or more subtitle chunks using any known or hereafter developed string matching/differencing technique. The subtitle text string approximately overlaps in time with the comparison text segment based on timestamps of the comparison text segment and the subtitle chunks. Store the determined measure of similarity as a (current) maximum measure of similarity.

g. Add/subtract a word from ends of the subtitle text string to lengthen/shorten the subtitle text string, and repeat operation (a) to determine a new measure of similarity. Only if/when the new measure of similarity exceeds the maximum measure of similarity from operation (a), set the maximum measure of similarity equal to the new measure of similarity.

h. Repeat operations (a) and (b) until a predetermined termination condition has been met, e.g., a predetermined maximum measure of similarity has been reached, and declare the subtitle text string and comparison text a match for purposes of comparison (this is a result output by the text matching algorithm).

i. Move to the next comparison text segment and the next subtitle text string, and repeat operations (a)-(c).

At 306, compare logic 124 determines an overall measure of intelligibility of the dialogue of the original mixed soundtrack B to a listener based on a comparison between the comparison text and the matching ones of the text-based subtitles C. More specifically, compare logic 124 determines individual differences between the segments of the comparison text and the subtitle text of corresponding ones of the subtitle chunks that represents the same/common dialogue, as determined by the text matching algorithm. Compare logic 124 combines the individual differences into the overall measure of intelligibility of the dialogue.

Compare logic 124 provides the overall measure of intelligibility of the dialogue of the original mixed soundtrack B, and the individual measures of intelligibility of the dialogue (and indications of subtitle quality), e.g., as represented by the individual differences, to report generator 126, which generates dialogue intelligibility reports as described herein.

Dialogue Intelligibility of Modified Mixed Soundtrack (With Sound Effect)

Operations 306, 308, and 310 collectively assess the intelligibility of the modified mixed soundtrack E referenced to the text-based subtitles C.

At 308, compare logic 124 receives the subtitles C for use as reference text, as described above.

Operation 310 is similar to operation 208 described above. At 310, acoustic emulator 122 receives the original mixed soundtrack B and the sound modifier signal D. Sound effects emulator 122 simulates one or more sound effects based on the sound modifier signal D, and modifies the original mixed soundtrack B with the sound effects, to produce the modified mixed soundtrack E. Sound effects emulator 122 provides the modified mixed soundtrack E to ASR engine 120. ASR engine 120 converts the modified mixed soundtrack E to comparison text in the manner described above. ASR engine 120 provides the comparison text, including successive comparison text segments, to compare logic 124.

At 306, compare logic 124 determines an overall measure of intelligibility of the dialogue of the modified mixed soundtrack E based on a comparison between the comparison text and the text-based subtitles C, in the manner described above. Compare logic 124 provides the overall measure of intelligibility of the dialogue of the modified mixed soundtrack E, and the individual measures of intelligibility of the dialogue, to report generator 126, which generates dialogue intelligibility reports as described herein.

Using the dialogue intelligibility reports mentioned above as a guide, dialogue evaluator 104 may rerecord or remix the original mixed audio soundtrack when the dialogue intelligibility reports indicate degraded intelligibility of the dialogue with or without emulated sound effects, to produce a remixed soundtrack. Dialogue analyzer 102 may be used to assess the intelligibility of the dialogue of the remixed soundtrack, and the remix/assess process may be repeated as necessary.

Timing Diagrams for ASR Segments and Subtitles

Figure 4A:
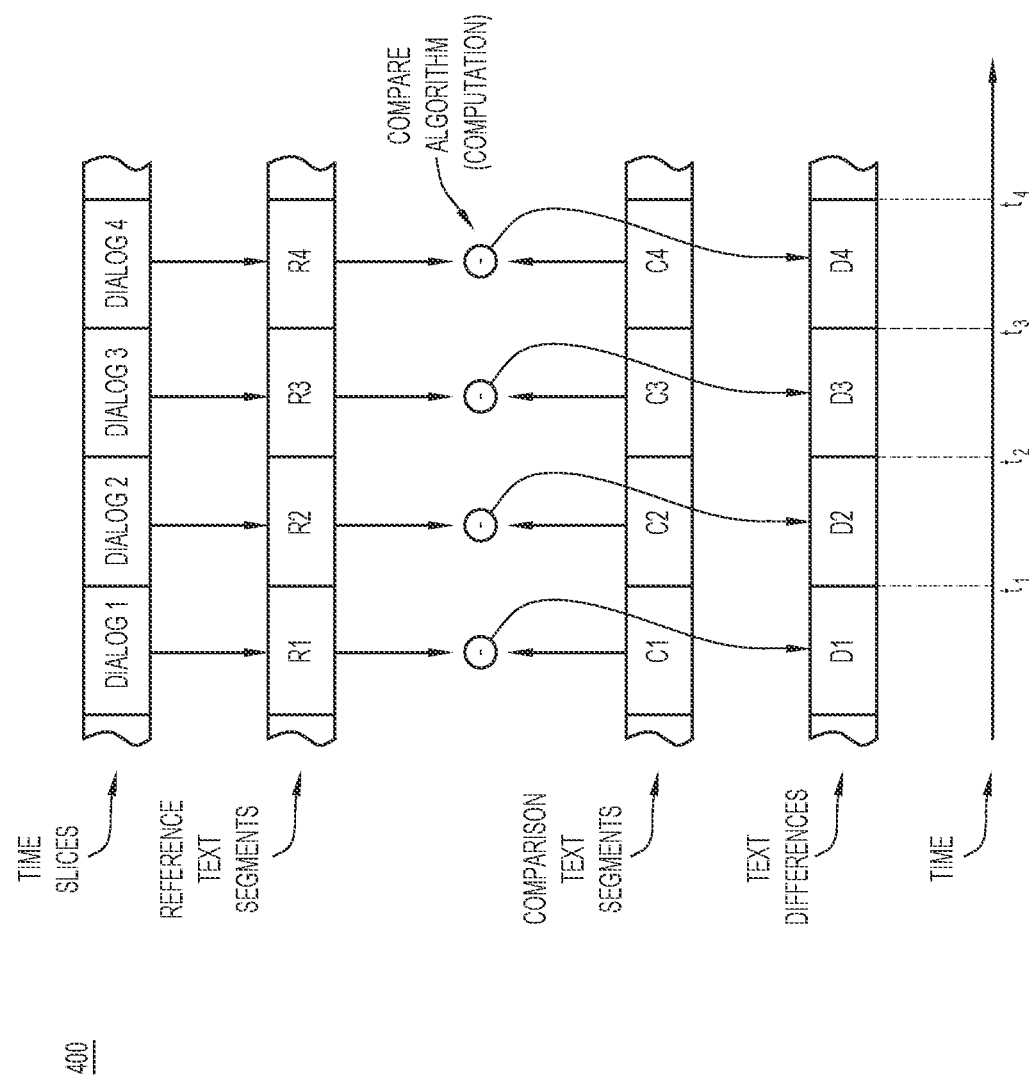
FIG. 4A is an illustration of example timing associated with converting successive time slices of soundtrack dialogue to corresponding successive segments of reference/ comparison text by an ASR engine of the dialogue analyzer.

With reference to FIG. 4A, there is an illustration of example timing 400 associated with converting successive time slices of soundtrack dialogue, DIALOG1-DIALOG4, to corresponding successive segments of reference/comparison text by ASR engine 120. The segments of reference/comparison text are also referred to as "ASR text segments" or simply "ASR text." Timing 400 shows successive segments of reference text ("reference text segments") R1-R4, and corresponding successive segments of comparison text ("comparison text segments") C1-C4, corresponding to the time slices of soundtrack dialogue DIALOG1-DIALOG4. Successive individual differences D1-D4 represent individual differences between corresponding ones of the reference text segments R1-R4 and the comparison text segments C1-C4, i.e., individual difference Di is the difference between text segments Ri and Ci. One or more compare algorithms (indicated at "–" in FIG. 4A) generate individual differences D1-D4, which may include text distances, pattern matching results, and so on. Each individual difference Di may represent a corresponding individual measure of intelligibility of dialogue for the corresponding comparison text segment Ci.

Figure 4B:
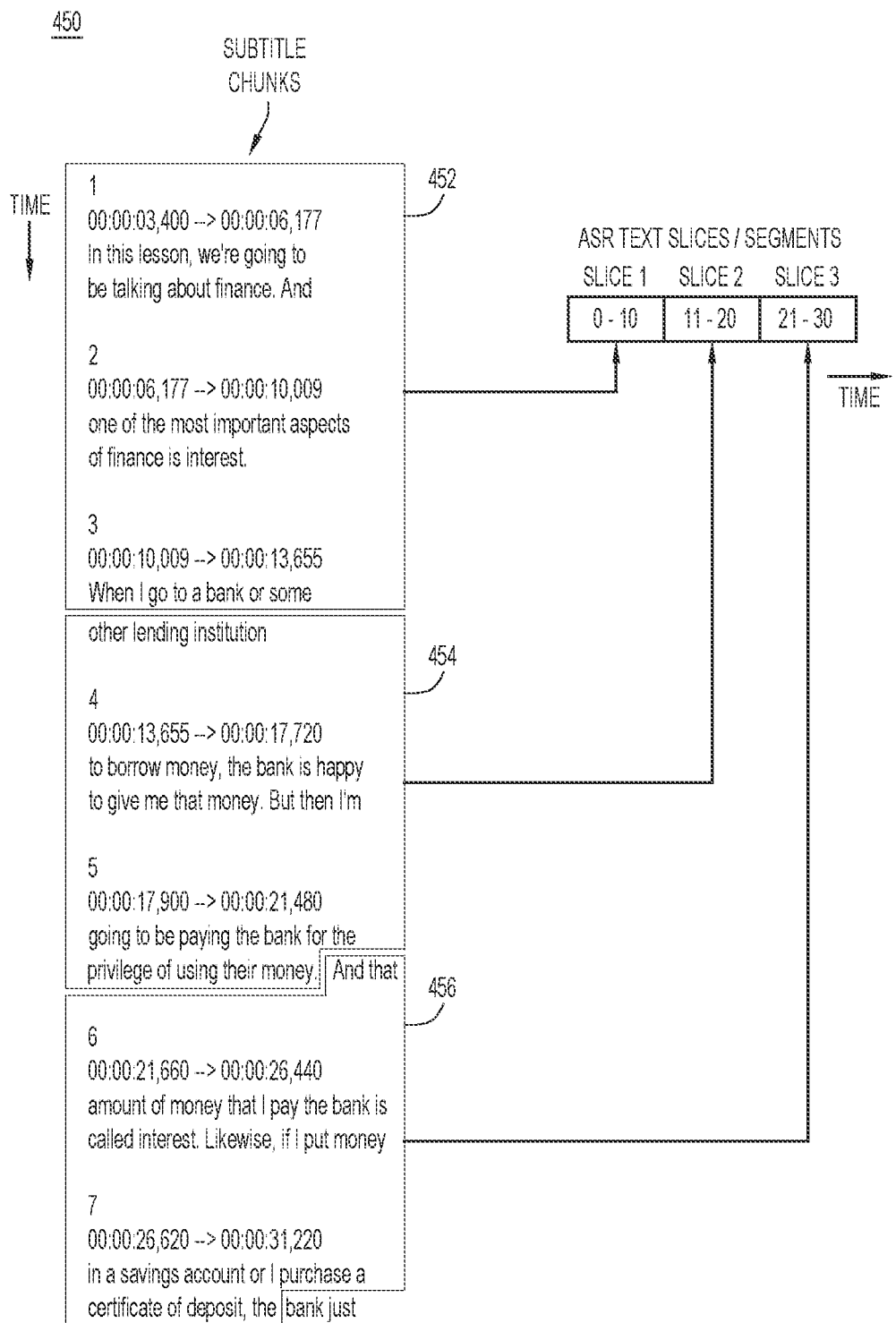
FIG. 4B is an illustration of example text matching of subtitle chunks to automatic speech recognition (ASR) text segments corresponding to time slices of dialogue of fixed duration.

With reference to FIG. 4B, there is an illustration of an example 450 that shows text matching of SRT subtitle chunks 1-7 spanning corresponding varying time intervals to successive ASR text segments corresponding to successive time slices slice1, slice2, and slice3 of dialogue each having a fixed duration of 10 seconds. Each subtitle chunk is defined by a leading subtitle sequence number (e.g., 1, 2, . . . , 7), and a time interval (e.g., "00:00:03, 400→00: 00:06,177"), where a comma separates seconds from milliseconds. In the example of FIG. 4B, the above-described text matching algorithm matches (i) the subtitle text string encompassed by box 452 spanning subtitle chunks 1-3 to the dialogue of ASR text slice1, (ii) the subtitle text string encompassed by box 454 spanning subtitle chunks 3-5 to the dialogue of ASR text slice2, and (iii) the subtitle text string encompassed by box 456 spanning subtitle chunks 5-7 to the dialogue of ASR text slice3.

Dialogue Intelligibility Reports

Dialogue intelligibility reports generated for display, and then displayed, by dialogue analyzer 102 are now described in connection with FIGS. 5-12. The dialogue intelligibility reports may be displayed in panels of user interfaces, for example.

Figure 5:
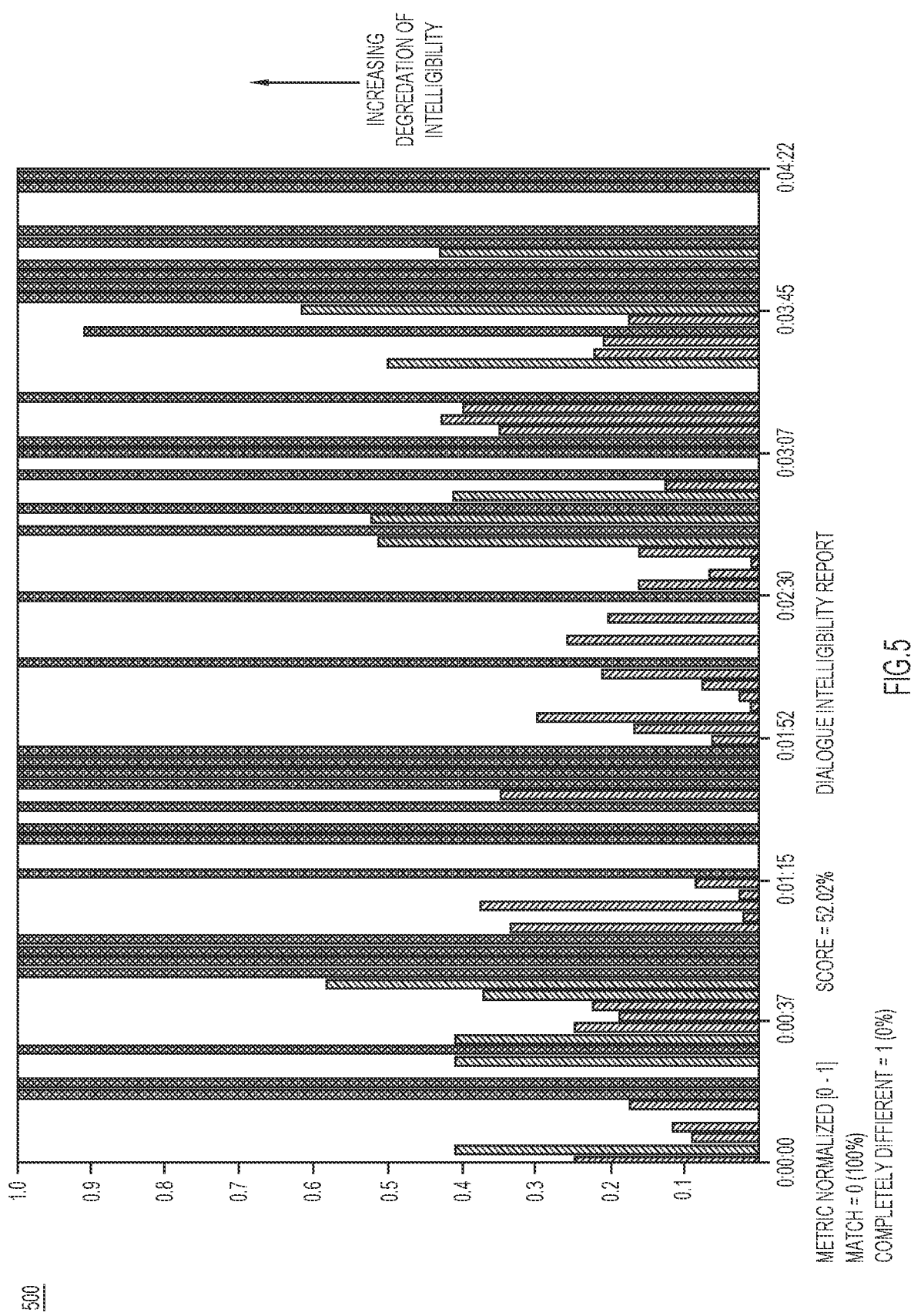
FIG. 5 is an illustration of an example dialogue intelligibility report in the form of a plot of the measure of intelligibility of dialogue (shown in histogram form) vs. time generated by the dialogue analyzer as a result of a comparison between reference text and comparison text.

With reference to FIG. 5, there is an illustration of an example dialogue intelligibility report 500 in the form of a plot of the measure of intelligibility of dialogue (vertical axis) vs. time (horizontal axis) that results from a comparison between reference text and comparison text. The measure of intelligibility is normalized from 0 to 1, where 0 represents a perfect match (i.e., a 100% match), and 1 represents a complete mismatch or completely different text (i.e., a 0% match or complete mismatch). The time axis shows time from 0 minutes to 4 minutes and 22 seconds, in time increments of approximately 10 seconds (i.e., using a time slice duration of approximately 3 seconds).

The vertical bars on the plot represent individual measures of intelligibility for text segments/time slices. Given the intelligibility mapping match=0 and mismatch=1, the individual measures of intelligibility may be interpreted as measures of degradation of intelligibility, because increases in the measures represent increases in the degradation of intelligibility. Also, to enhance readability, individual measures of intelligibility that fall within different ranges may be depicted in different colors, shades, or cross-hatching patterns. For example, individual measures of intelligibility that exceed a predetermined threshold (and thus represent higher levels of degradation) may be depicted in a first color (e.g., red), while individual measures of intelligibility that do not exceed the predetermined threshold (and thus represent lower levels of degradation) may be depicted in a second color (e.g., green). Multiple predetermined thresholds and corresponding colors/shades/cross-hatchings may be used to delineate one or more ranges between green and red.

The example of FIG. 3 includes three different cross-hatching patterns, which may be replaced with corresponding colors (or bolding, dashed lines, and the like), to indicate three corresponding levels of intelligibility of dialogue, including: (i) double cross-hatches (i.e., "x" cross-hatches) to indicate least intelligible dialogue, i.e., intelligibility in a range of maximum degradation; (ii) single cross-hatches having a negative slope (i.e., falling in height from left-to-right) to indicate most intelligible dialogue, i.e., intelligibility in a range of minimum degradation; and (iii) single cross-hatches with a positive slope (i.e., rising in height from left-to-right) to indicate a range of intelligibility of dialogue between the most intelligible and the least intelligible dialogue.

Additionally, dialogue intelligibility report 500 includes an overall measure of intelligibility of dialogue, referred to as an "overall score," computed based on the individual measures of intelligibility. In the example of FIG. 5, the overall score is 52.02%.

Various dialogue intelligibility reports for the same dialogue on different soundtracks, referenced to text-based subtitles for the dialogue, are described below in connection with FIGS. 6-9. The dialogue intelligibility reports result from the analysis performed by method 300, for example.

Figure 6:
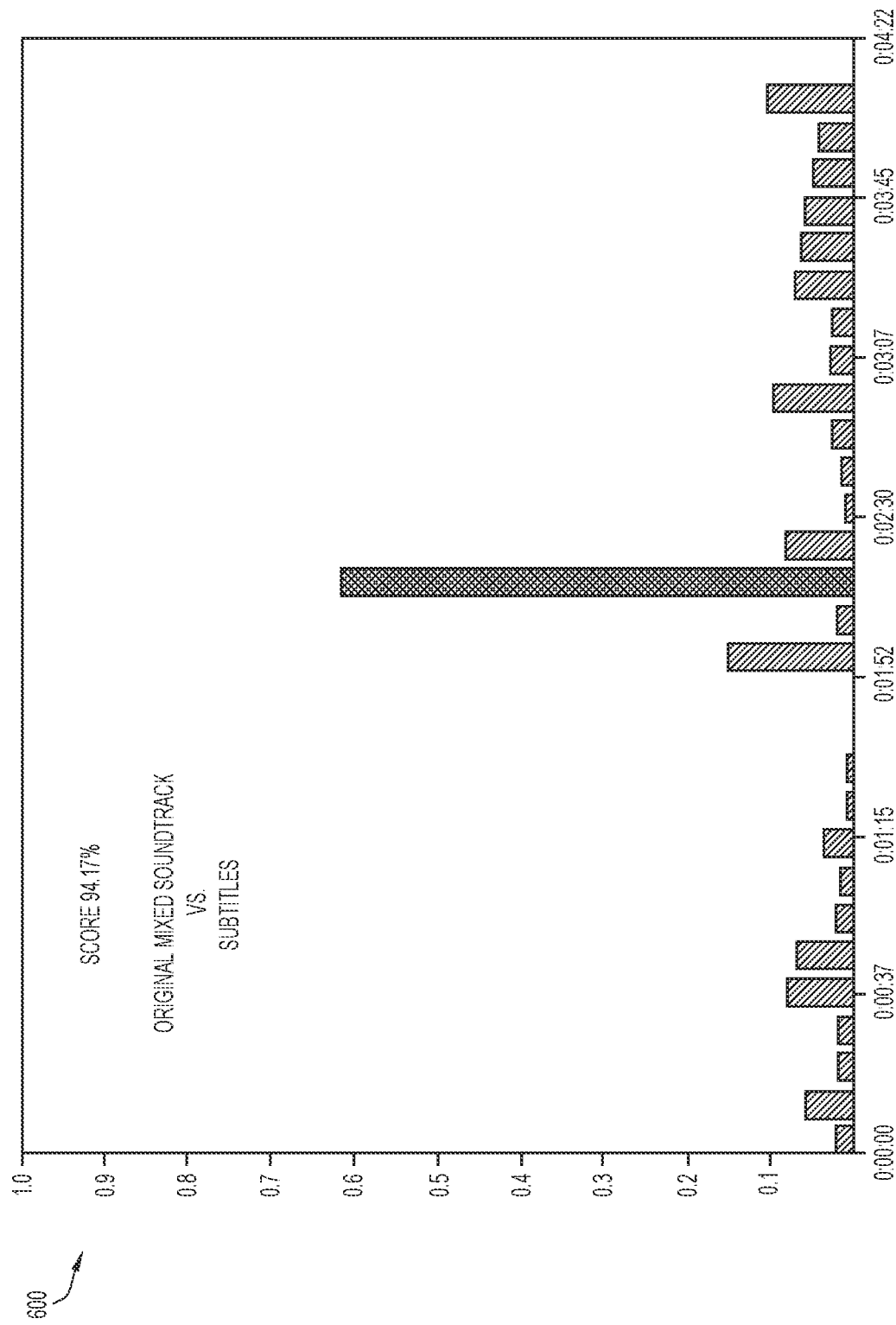
FIG. 6 is an illustration of an example dialogue intelligibility report in the form of a plot of the measure of intelligibility of the dialogue of an original mixed soundtrack referenced against subtitles, and which indicates the quality of the subtitles.

With reference to FIG. 6, there is an illustration of an example dialogue intelligibility report 600 in the form of a plot of the measure of intelligibility of the dialogue of an original mixed soundtrack (e.g., original mixed soundtrack B) referenced against the subtitles (e.g., subtitles C). In other words, the plot shows results of a comparison between reference text in the form of the subtitles and comparison text derived from the original mixed soundtrack. Thus, the plot indicates subtitle quality. The vertical bars on the plot represent individual measures of intelligibility (or degradation of intelligibility) that result from comparisons between comparison text segments and corresponding subtitle chunks, as described above. The plot also indicates that the original mixed soundtrack has an overall score of 94.17%.

Figure 7:
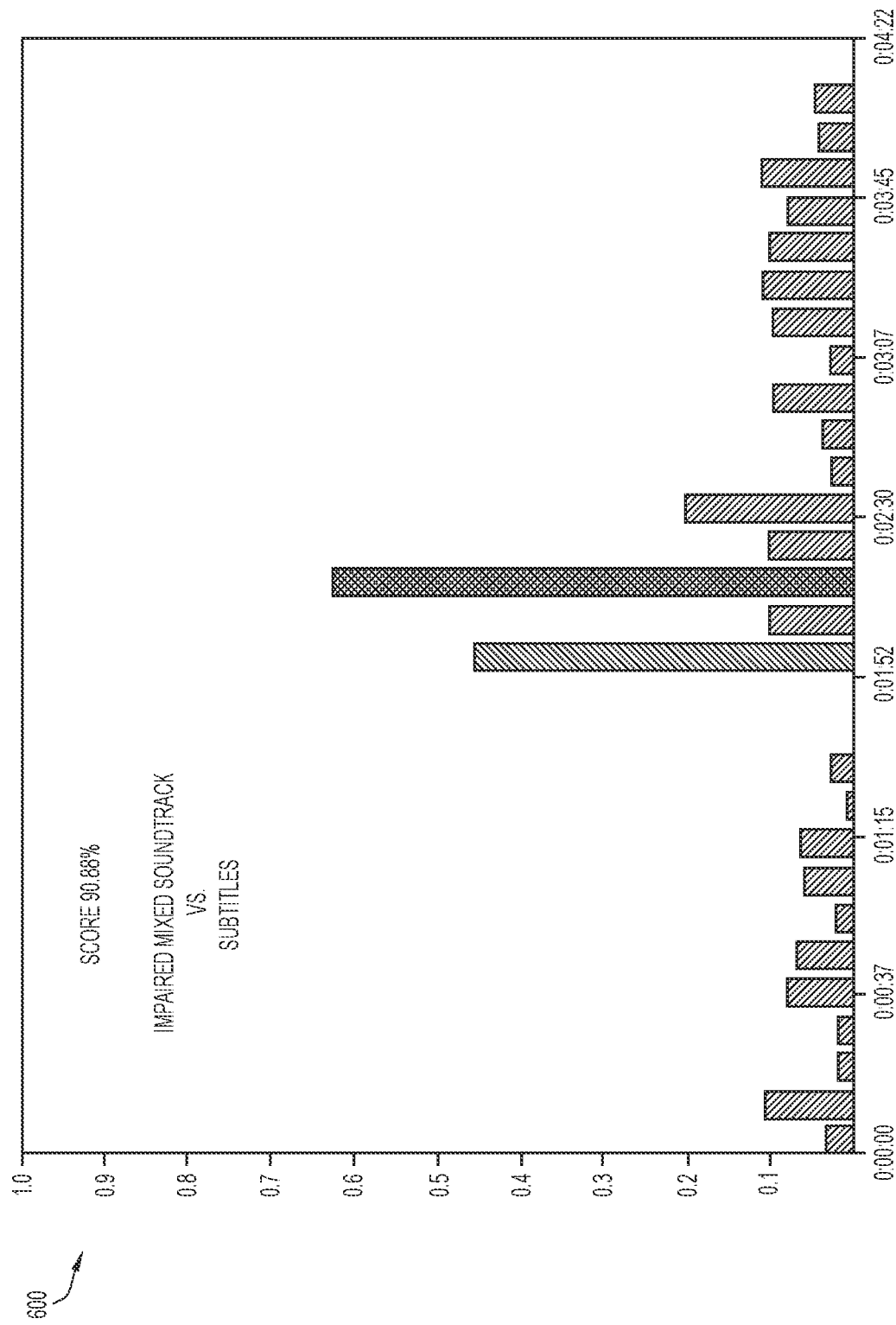
FIG. 7 is an illustration of an example dialogue intelligibility report in the form of a plot of the measure of intelligibility of the dialogue of a modified mixed soundtrack referenced against the subtitles.

With reference to FIG. 7, there is an illustration of an example dialogue intelligibility report 700 in the form of a plot of the measure of intelligibility of the dialogue of an modified mixed soundtrack (e.g., modified mixed soundtrack E), i.e., the original mixed soundtrack of FIG. 6 combined with emulated sound effects, referenced against the subtitles. The plot shows an outstanding dialogue intelligibility degradation artifact at time just after 1:52 that results from the emulated sound effects. The plot indicates that the modified mixed soundtrack has an overall score of 90.88%, which is decreased with respect to the score of the plot of FIG. 6 due to the sound effects.

With reference to FIG. 8, there is an illustration of an example intelligibility report 800 in the form of a table having (i) enumerated rows for successive time slices of the dialogue from FIGS. 6 and 7, and (ii) columns for various data corresponding to each of the time slices (i.e., rows). Moving left-to-right across the table, the columns include:
  j. Time slice identifier (ID) column 804 for a row/time slice identifier for each time slice of dialogue.
  k. Reference text column 806 for reference text in the form of subtitle text (e.g., SRT text) for each time slice.
  l. Timestamp columns 808 and 810 for start and end times of each time slice.
  m. Comparison text column 812 that quotes a comparison text segment resulting from ASR of each time slice of the original mixed soundtrack.
  n. Score column 814 for an individual measure of intelligibility (i.e., an individual score) of each comparison text segment referenced to the corresponding subtitle text in column 806. Thus, the individual measure indicates subtitle quality. The individual score is represented as a percentage match (0-100%) between the subtitle text and the comparison text. In an example in which the individual score represents an aggregate score resulting from multiple compare algorithms as described above, score column 814 may be subdivided into multiple score columns, including a respective column for a score computed by each of the compare algorithms, and a column for the aggregate score. For example, in an example in which compare logic 124 combines Editex and Cosine distances into an aggregate text distance, the intelligibility score column may be subdivide into a first column for an Editex distance, a second column for a Cosine distance, and a third column for an aggregate text distance that combines the Editex and the Cosine distances.
  o. Comparison text column 816 that quotes a comparison text segment resulting from ASR of each time slice of the modified mixed soundtrack, i.e., the original mixed soundtrack combined with the emulated sound effects.
  p. Score column 818 for an individual measure of intelligibility (i.e., individual score) of each comparison text segment for the modified mixed soundtrack referenced to the corresponding subtitle text.
  q. Confidence level column 820 for a confidence level that each score is computed correctly. ASR engine 120 may compute the confidence level.

Time slices/rows of the table associated with intelligibility scores that are below a predetermined threshold indicative of a poor intelligibility (e.g., 75%) may be depicted in red, while other rows may be depicted in green or black, for example. In the example of FIG. 8, time slices/rows 13 and 15 having low intelligibility scores may be depicted in red. More generally, such color coding highlights to a user specific degraded or bad segments.

Figure 9:
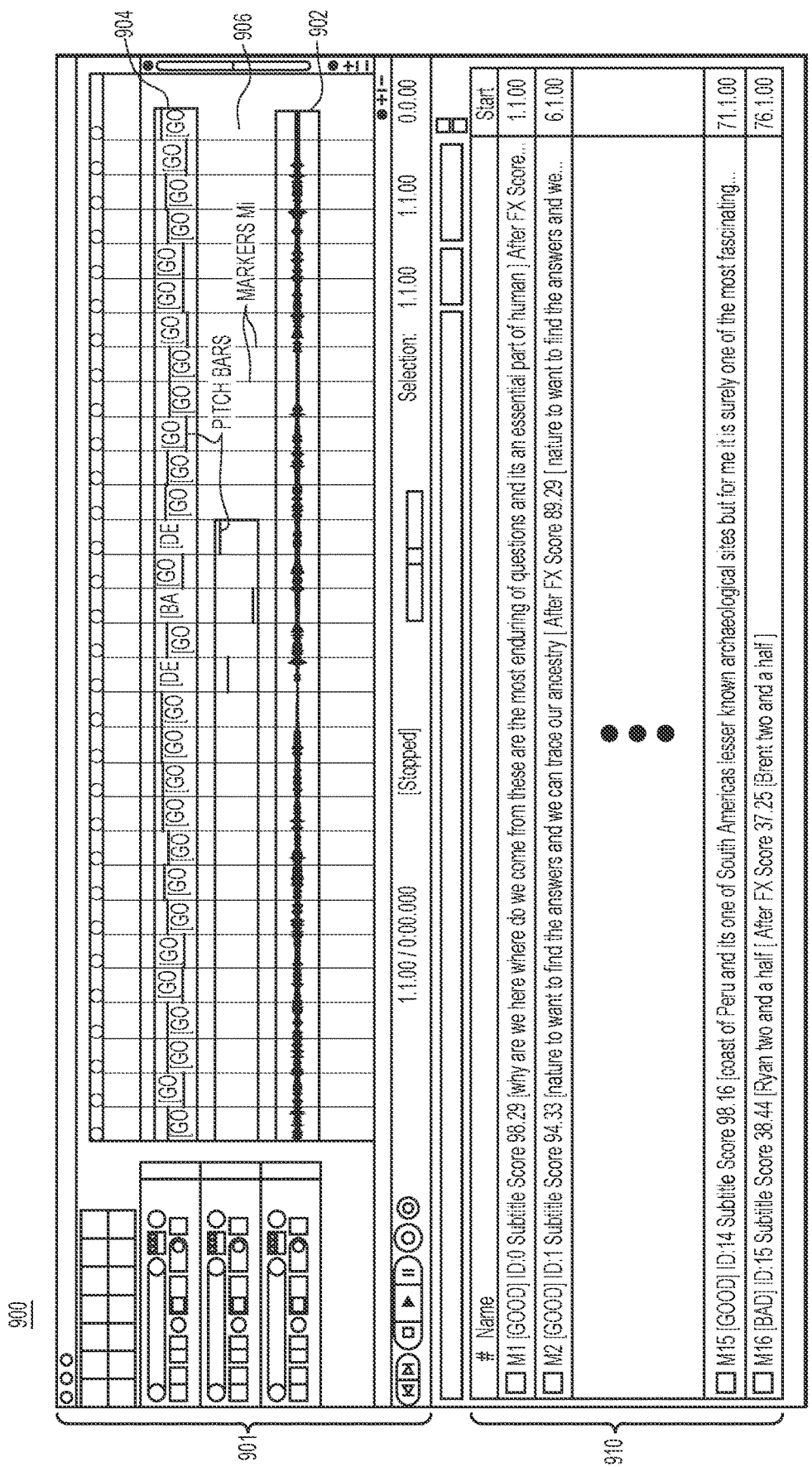
FIG. 9 is an illustration of example dialogue intelligibility report including metadata generated from comparison results.

With reference to FIG. 9, there is an illustration of example dialogue intelligibility report 900 including metadata generated by dialogue analyzer 102. Report 900 incorporates information/results from dialogue intelligibility report 800 of FIG. 8 into a standard MIDI file (SMF), for example. Report 900 depicts content of the MIDI file. The MIDI file may be processed in any DAW configured to process MIDI files. A top section 901 of the MIDI file depicts vertically arranged tracks 902, 904, and 906 each divided into successive time slices indicated by vertical markers enumerated M1-Mn, moving left-to-right across the tracks. Track 902 is an audio waveform for a dialogue soundtrack. Tracks 904 and 906 are MIDI tracks that represent intelligibility scores for the time slices as horizontal pitch bars, for which pitches from 0-127 represent intelligibility scores from 0-1. Track 904 shows only "GOOD" intelligibility scores (indicated by an abbreviated label "GO") that exceed a predetermine threshold. Track 906 shows only degraded/bad "DEG" intelligibility scores (indicated by an abbreviated label "DE") that do not exceed the predetermined threshold. A bottom section 910 of the MIDI file depicts rows of text corresponding to markers M1-Mn, intelligibility scores corresponding to the text, and generalized intelligibility indicators "GOOD" and "BAD."

Figure 10:
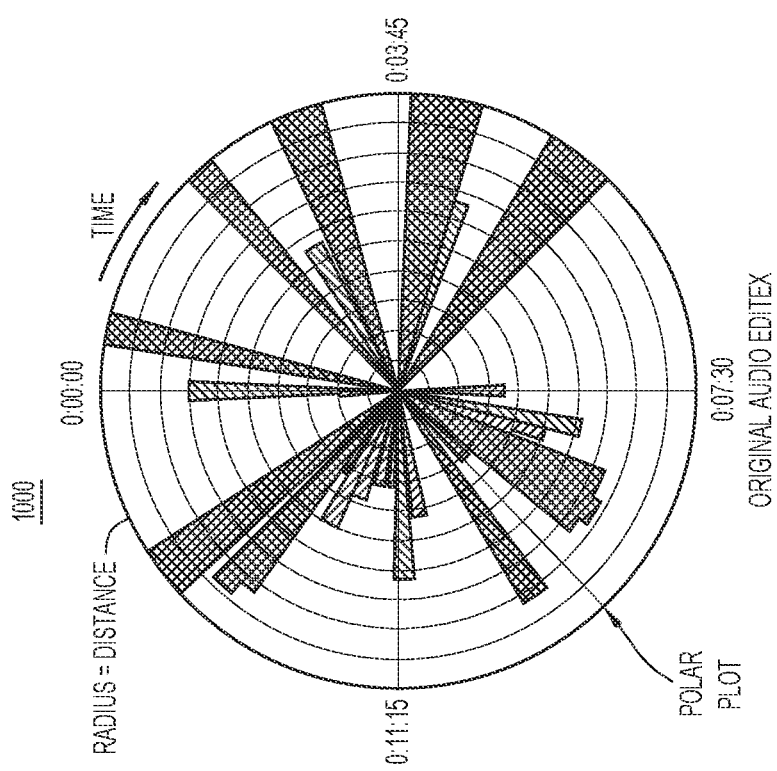
FIG. 10 is an illustration of an example dialogue intelligibility report in the form of a polar plot of text distance vs. time generated by the dialogue analyzer as a result of a comparison between reference text and comparison text using an Editex text distance algorithm.

With reference to FIG. 10, there is an illustration of an example dialogue intelligibility report 1000 in the form of a polar plot of text distance (i.e., radius) vs. time (angular rotation/displacement) generated for display by dialogue analyzer 102 as a result of a comparison between reference text and comparison text spanning a length of time. On the plot, text distance (i.e., radius) may be normalized from 0 to 1, where 0 represents a complete match and 1 represents a complete mismatch. In the example of FIG. 10, dialogue analyzer 102 determined the distances based on phonetics using the Editex algorithm. As described in connection with FIG. 10, different ranges of distances may be depicted in different colors or with other types of different formatting, such as bolding or dashed lines.

Figure 11:
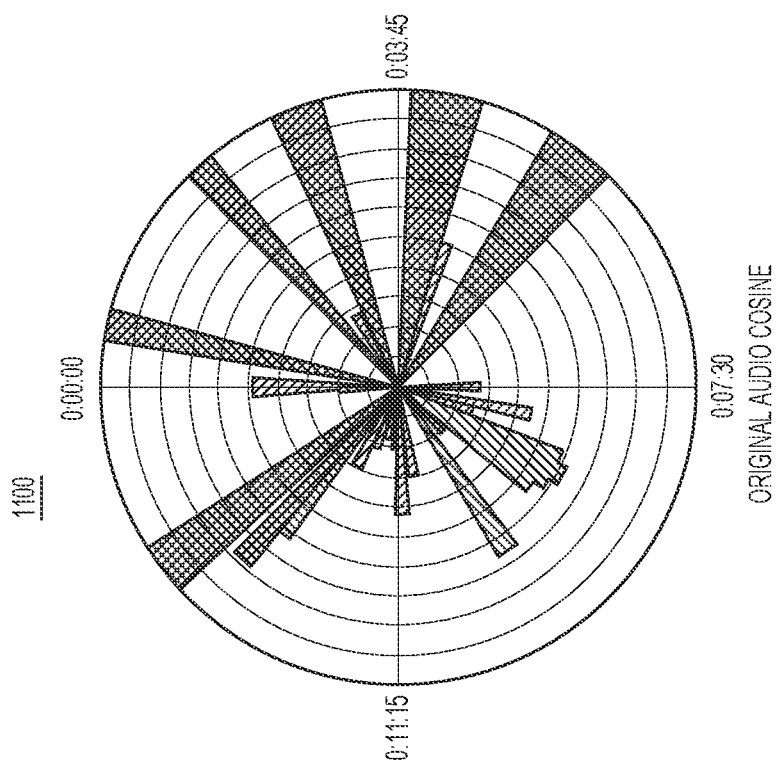
FIG. 11 is an illustration of an example dialogue intelligibility report in the form of a polar plot of text distance vs. time generated by the dialogue analyzer as a result of a comparison between reference text and comparison text using a Cosine text distance algorithm.

With reference to FIG. 11, there is an illustration of an example intelligibility degradation report 1100 in the form of a polar plot of text distance (i.e., radius) vs. time (angular rotation) generated for display by dialogue analyzer 102 as a result of a comparison between the same reference text and the same comparison text spanning the same length of time as that shown in FIG. 10. In the example of FIG. 11, dialogue analyzer 102 determined the text distances based on word and character differences according to the Cosine distance algorithm.

High-Level Flowchart

Figure 12:
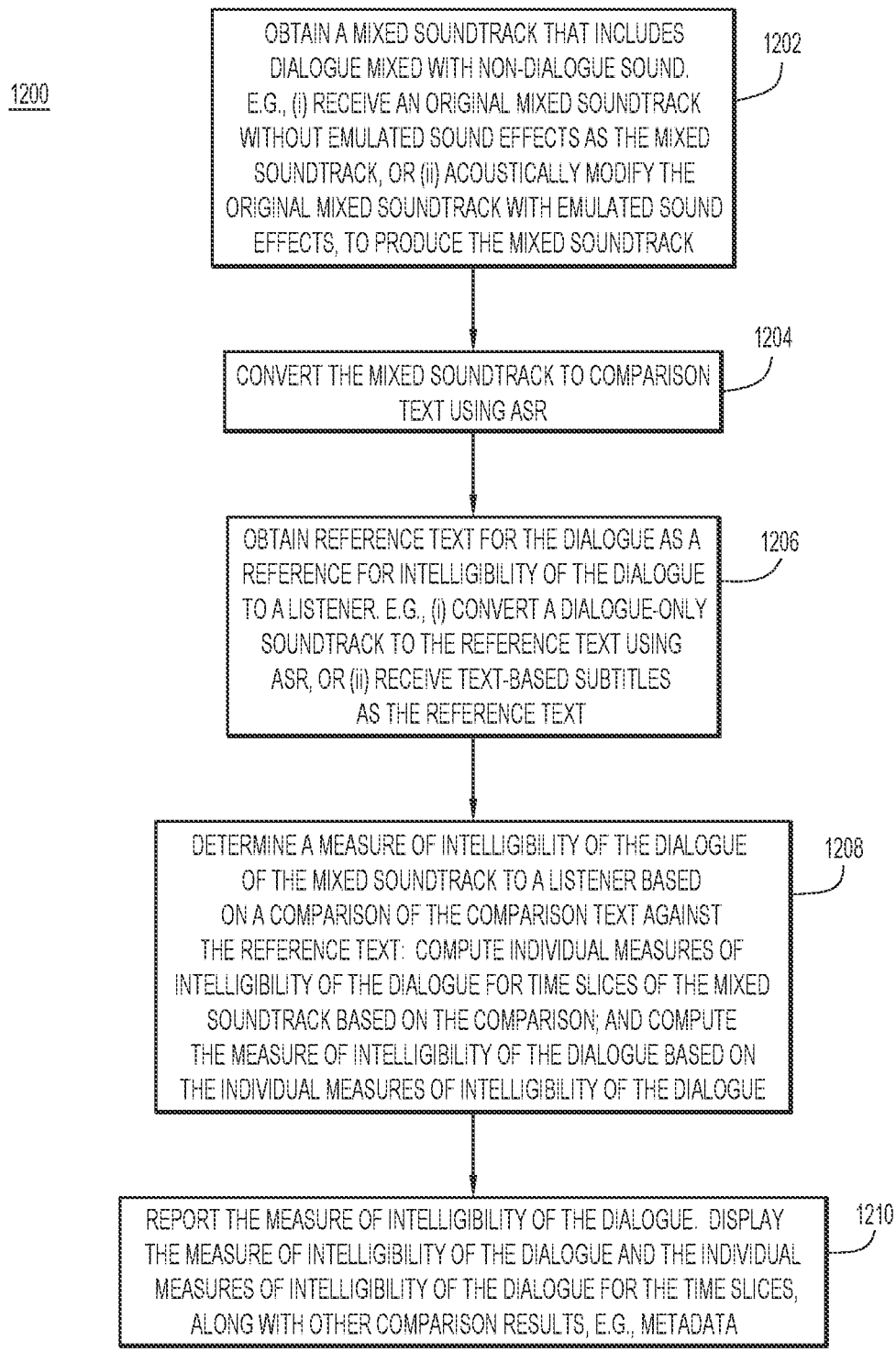
FIG. 12 is a flowchart of an example high-level method of assessing the intelligibility of dialogue in soundtracks.

With reference to FIG. 12, there is a flowchart of an example method 1200 of determining intelligibility of dialogue that summarizes operations described above. Method 1200 may be performed by dialogue analyzer 102.

At 1202, dialogue analyzer 102 obtains a mixed soundtrack that includes dialogue mixed with non-dialogue sound. For example, dialogue analyzer receives an original mixed soundtrack that includes the dialogue mixed with the non-dialogue sound, and uses that soundtrack as the mixed soundtrack. Alternatively, dialogue analyzer acoustically modifies the original mixed soundtrack with emulated sound effects that emulate one or more of room acoustics, sound reproduction system playback acoustics, and background noise, to produce the mixed soundtrack.

At 1204, dialogue analyzer 102 converts time slices of the mixed soundtrack to successive segments of comparison text using ASR.

At 1206, dialogue analyzer 10 obtains reference text for the dialogue as an ideal reference/standard for intelligibility of the dialogue to a listener. For example, dialogue analyzer 102 converts time slices of a dialogue-only soundtrack to successive segments of the reference text using ASR. Alternatively, dialogue analyzer receives text-based subtitles of the dialogue as the reference text.

At 1208, dialogue analyzer 102 determines a measure of intelligibility of the dialogue (i.e., an overall dialogue intelligibility metric) of the mixed soundtrack to the listener based on a comparison of the comparison text against the reference text. For example, dialogue analyzer (i) computes individual measures of intelligibility of the dialogue (i.e., individual dialogue intelligibility metrics) for the time slices of the mixed soundtrack based on the comparison (i.e., based on comparisons between corresponding segments of the comparison text and the reference text), and (ii) computes the measure of intelligibility of the dialogue based on the individual measures of intelligibility of the dialogue.

In an example, dialogue analyzer 102 may compute the measure of intelligibility (and the individual measures of intelligibility) as a difference between corresponding reference text and comparison text using one or more compare algorithms. For example, dialogue analyzer 102 may perform operations that:
r. Compute a first difference (e.g., a first text distance) between the corresponding reference text and comparison text using a first compare algorithm (e.g., a first text distance algorithm).
s. Compute a second difference (e.g., a second text distance) between the corresponding reference text and comparison text using a second compare algorithm (e.g., a second text distance algorithm).
t. Compute the difference (e.g., a combined text distance) between the corresponding reference text and comparison text as a weighted combination of the first difference (e.g., the first text distance) and the second difference (e.g., the second text distance).

At 1210, dialogue analyzer 102 reports, e.g., generates for display, and may then display, the measure of intelligibility of the dialogue the measure of intelligibility of the dialogue, the individual measures of intelligibility of the dialogue for the time slices, and other comparison results, e.g., metadata. Alternatively and/or additionally, dialogue analyzer 102 may store the report to a file for subsequent access by a user.

Computer System

Figure 13:
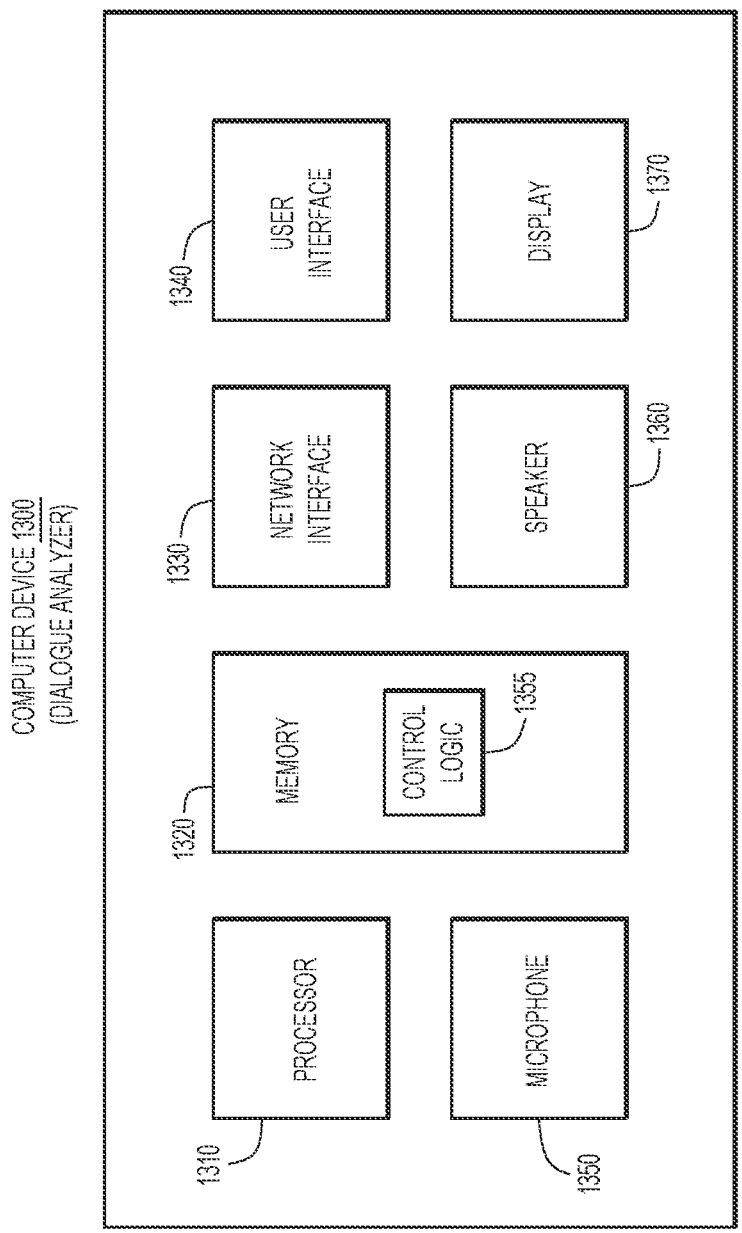
FIG. 13 is a block diagram of an example computer system/device in which the audio analyzer may be implemented.

FIG. 13 is a block diagram of an example computer device 1300 upon which embodiments presented herein may be implemented. For example, computer device 1300 may represent dialogue analyzer 102, and may be implemented in a personal computer (PC), smart phone, tablet PC, and the like. The computer device 1300 includes a processor or controller 1310 to process instructions relevant to processes described herein, memory 1320 to store a variety of data and software instructions. The processor 1310 is, for example, a microprocessor or microcontroller that executes instructions of computer device control logic 1355 in memory 1320 for implementing the processes described herein for dialogue analyzer 102. The computer device also includes a network interface unit (e.g., card) 1330 to communicate with other devices over a communication network, such as the Internet and/or a local area network (LAN). Network interface unit 1330 may include an Ethernet card with a port (or multiple such devices) to communicate over wired Ethernet links and/or a wireless communication card with a wireless transceiver to communicate over wireless links. The computer device 1300 also includes other interface units, including hardware plugs and/or receptacles to connect physically to other devices, optical interfaces, audio interfaces, and the like.

The computer device may further include a user interface unit 1340 to receive input from a user, microphone 1350 and loudspeaker 1360. The user interface unit 1340 may be in the form of a keyboard, mouse and/or a touchscreen user interface to allow for a user to interface with the computer device. Microphone 1350 and loudspeaker 1360 enable audio to be recorded and output. The computer device may also comprise a display 1370, including, e.g., a touchscreen display, that can display data to a user.

Memory 1320 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 1320 may comprise one or more tangible (non-transitory) computer readable storage media/medium (e.g., a memory device) encoded with software (e.g., control logic/software 1355) comprising computer executable instructions and when the software is executed (by the processor 1310) it is operable to perform the operations described herein directed to dialogue analyzer 102. Logic 1355 may include logic for an ASR engine, an acoustic emulator, compare logic, and a report generator, described above. Logic 1355 includes instructions to generate and display user interfaces to present information on display 1370 and allow a user to provide input to the computer device 1300 through, e.g., user selectable options of the user interface. Memory 1320 also stores data generated and used by computer device control logic 1355, such as data for soundtracks, comparison results, metadata, and so on.

In summary, in one form, a method is provided comprising: obtaining a mixed soundtrack that includes dialogue mixed with non-dialogue sound; converting the mixed soundtrack to comparison text; obtaining reference text for the dialogue as a reference for intelligibility of the dialogue; determining a measure of intelligibility of the dialogue of the mixed soundtrack to a listener based on a comparison of the comparison text against the reference text; and reporting the measure of intelligibility of the dialogue.

In another form, an apparatus is provided comprising: a processor configured to: obtain a mixed soundtrack that includes dialogue mixed with non-dialogue sound; convert the mixed soundtrack to comparison text; obtain reference text for the dialogue as a reference for intelligibility of the dialogue to a listener; compute individual measures of intelligibility of the dialogue of the mixed soundtrack based on a comparison between the comparison text and the reference text; compute an overall measure of intelligibility of the dialogue of the mixed soundtrack based on the individual measures of intelligibility of the dialogue; and generate a report including the overall measure of intelligibility of the dialogue.

In yet another form, a non-transitory computer readable medium is provided. The computer readable medium is encoded with instructions that, when executed by a processor, cause the processor to: obtain a mixed soundtrack that includes dialogue mixed with non-dialogue sound; convert time slices of the mixed soundtrack to comparison text using automatic speech recognition (ASR); obtain reference text for the dialogue as a reference for intelligibility of the dialogue; compute individual measures of intelligibility of the dialogue of the mixed soundtrack for the time slices based on differences between the comparison text and the reference text; compute an overall measure of intelligibility of the dialogue of the mixed soundtrack based on the individual measures of intelligibility of the dialogue; and generate a report including the overall measure of intelligibility of the dialogue and the individual measures of intelligibility of the dialogue.

Although the techniques are illustrated and described herein as embodied in one or more specific examples, it is nevertheless not intended to be limited to the details shown, since various modifications and structural changes may be made within the scope and range of equivalents of the claims.

Each claim presented below represents a separate embodiment, and embodiments that combine different claims and/or different embodiments are within the scope of the disclosure and will be apparent to those of ordinary skill in the art after reviewing this disclosure.

What is claimed is:

1. A method comprising:
   receiving an original mixed soundtrack that includes dialogue mixed with non-dialogue sound;
   acoustically modifying, by an audio-visual device, the original mixed soundtrack with emulated sound effects to produce a mixed soundtrack, wherein the emulated sound effects emulate frequency responses of one or more room acoustics, sound reproduction system playback acoustics, or background noise;
   converting the mixed soundtrack to comparison text using automatic speech recognition (ASR);
   obtaining reference text for the dialogue as a reference for intelligibility of the dialogue;
   determining a measure of intelligibility of the dialogue of the mixed soundtrack to a listener based on a comparison of the comparison text against the reference text, wherein the determining the measure of intelligibility of the dialogue includes;
      computing individual measures of intelligibility of the dialogue for time slices of the mixed soundtrack based on the comparison by determining differences between segments of the comparison text corresponding to the time slices of the mixed soundtrack and corresponding segments of the reference text; and
      computing the measure of intelligibility of the dialogue based on the individual measures of intelligibility of the dialogue;
      determining whether the measure of intelligibility of the dialogue indicates a degraded intelligibility; and
      in response to the measure of intelligibility of the dialogue indicating the degraded intelligibility, producing a second mixed soundtrack.

2. The method of claim 1, wherein the reporting includes:
   displaying the measure of intelligibility of the dialogue and the individual measures of intelligibility of the dialogue.

3. The method of claim 1, wherein the reporting includes:
   displaying the measure of intelligibility of the dialogue, the individual measures of Intelligibility of the dialogue, the segments of the comparison text, and the corresponding ones of the segments of the reference text.

4. The method of claim 1, further comprising:
   generating metadata configured for a digital reproduction device and that includes at least the individual measures of intelligibility of the dialogue.

5. The method of claim 1, wherein:
   the reference text includes chunks of subtitle text that span respective time intervals; and
   the determining the measure of intelligibility includes determining individual differences between (i) segments of the comparison text corresponding to the time slices of the mixed soundtrack, and (ii) corresponding ones of the chunks of subtitle text that convey common dialogue to the segments of the comparison text.

6. The method of claim 5, further comprising:
   matching the segments of the comparison text to the corresponding ones of the chunks of subtitle text using a text matching algorithm that maximizes text similarity between each of the segments of the comparison text and matching ones of the chunks of subtitle text,
   wherein the determining the individual differences includes determining the individual differences based on results of the matching.

7. The method of claim 1, wherein the obtaining the reference text includes converting a dialogue-only soundtrack to the reference text.

8. The method of claim 1, wherein the obtaining the reference text includes receiving text-based subtitles of the dialogue as the reference text.

9. The method of claim 1, wherein the converting includes:
   using a machine-learning dialogue extractor, extracting the dialogue from the mixed soundtrack to produce a predominantly dialogue soundtrack; and
   converting the predominantly dialogue soundtrack to the comparison text.

10. The method of claim 1, wherein the determining the measure of intelligibility of the dialogue includes computing a difference between the comparison text and the reference text, and computing the measure of intelligibility of the dialogue based on the difference.

11. The method of claim 10, wherein the computing the difference includes computing the difference as a text distance representative of differences in letters or words, or as a phonetic text distance representative of differences in sound.

12. The method of claim 10, wherein the computing the difference includes:
   computing a first difference between the comparison text and the reference text using a first compare algorithm;
   computing a second difference between the comparison text and the reference text using a second compare algorithm that is different from the first compare algorithm; and
   computing the difference as a weighted combination of the first difference and the second difference.

13. An apparatus comprising: a processor configured to:
   receive an original mixed soundtrack that includes dialogue mixed with non-dialogue sound;
   acoustically modify, by an audio-visual device, the original mixed soundtrack with emulated sound effects to produce a mixed soundtrack, wherein the emulated sound effects emulate frequency responses of one or more room acoustics, sound reproduction system playback acoustics, or background noise;
   convert the mixed soundtrack to comparison text using automatic speech recognition (ASR);
   obtain reference text for the dialogue as a reference for intelligibility of the dialogue to a listener;
   compute individual measures of intelligibility of the dialogue of the mixed soundtrack based on a comparison between the comparison text and the reference text by determining differences between segments of the comparison text corresponding to time slices of the mixed soundtrack and corresponding segments of the reference text;

compute an overall measure of intelligibility of the dialogue of the mixed soundtrack based on the individual measures of intelligibility of the dialogue;

generate a report including the overall measure of intelligibility of the dialogue;

determine whether the measure of intelligibility of the dialogue indicates a degraded intelligibility; and in response to the measure of intelligibility of the dialogue indicating the degraded intelligibility, producing a second mixed soundtrack.

14. The apparatus of claim 13, wherein the processor is configured to obtain the reference text by receiving text-based subtitles of the dialogue as the reference text.

15. A non-transitory computer readable medium encoded with instructions that, when executed by a processor, cause the processor to:

receive an original mixed soundtrack that includes dialogue mixed with non-dialogue sound;

acoustically modify, by an audio-visual device, the original mixed soundtrack with emulated sound effects to produce a mixed soundtrack, wherein the emulated sound effects emulate frequency responses of one or more room acoustics, sound reproduction system playback acoustics, or background noise;

convert time slices of the mixed soundtrack to comparison text using automatic speech recognition (ASR);

obtain reference text for the dialogue as a reference for intelligibility of the dialogue;

compute individual measures of intelligibility of the dialogue of the mixed soundtrack for the time slices based on differences between the comparison text and the reference text by determining differences between segments of the comparison text corresponding to the time slices of the mixed soundtrack and corresponding segments of the reference text;

compute an overall measure of intelligibility of the dialogue of the mixed soundtrack based on the individual measures of intelligibility of the dialogue;

generate a report including the overall measure of intelligibility of the dialogue and the individual measures of intelligibility of the dialogue;

determine whether the measure of intelligibility of the dialogue indicates a degraded intelligibility; and in response to the measure of intelligibility of the dialogue indicating the degraded intelligibility, producing a second mixed soundtrack.

16. The non-transitory computer readable medium of claim 15, wherein the instructions to cause the processor to obtain the reference text include instructions to cause the processor to convert a dialogue-only soundtrack to the reference text using the ASR.

17. The non-transitory computer readable medium of claim 15, wherein the instructions to cause the processor to obtain the reference text include instructions to cause the processor to receive text-based subtitles of the dialogue as the reference text.

* * * * *